E. H. ROCKWOOD & C. D. SHEPARD.

Improvement in Knife-Polishers.

No. 129,594.                               Patented July 16, 1872.

WITNESSES                                INVENTORS.

129,594

UNITED STATES PATENT OFFICE.

EBENEZER H. ROCKWOOD AND CHARLES D. SHEPARD, OF BOSTON, MASS.

IMPROVEMENT IN KNIFE-POLISHERS.

Specification forming part of Letters Patent No. 129,594, dated July 16, 1872.

SPECIFICATION.

We, EBENEZER H. ROCKWOOD and CHARLES D. SHEPARD, both of Boston, in the county of Suffolk and State of Massachusetts, have invented an Improved Knife-Polisher, of which the following is a specification:

*Nature and Object of the Invention.*

The invention consists of a metallic cup or receptacle, of about an inch in diameter and an inch and a half in depth, to which is attached a handle. Upon one side of the cup, and near the open part, is a slight projection outward, provided with, at its lower part, small holes or orifices for delivering the contents of the cup downward. Into the open part of the cup is pressed a cork, which keeps the contents in the cup and serves as the polishing-surface. The object of the invention is clearly indicated by the device itself.

*Description of the Accompanying Drawing.*

Figure 1:
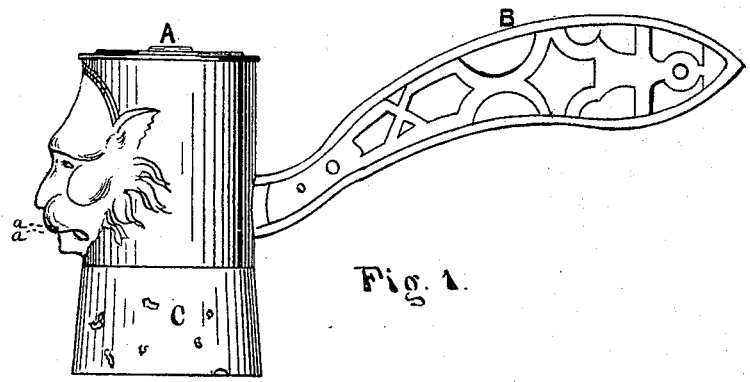
Figure 2:
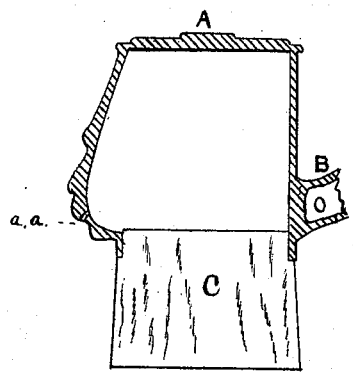

Figure 1 represents a side elevation of the invention. Fig. 2 represents a section of the same.

The letter A represents the cup; B, the handle; C, the cork; and $a\ a$, &c., the holes in the cup for delivering downward the contents thereof.

Into the receptacle or cup is placed pulverized scouring material, and the cork pressed into the open end. As the device with the polishing-cork is moved back and forth over the surface to be polished the scouring material is shaken down from the holes $a\ a$, &c., and the user has only to wet the polishing-end of the cork and the dust is shaken upon the surface to be polished. For the cup and handle, of course, any suitable material may be used in its construction.

Claim.

What we claim as our invention, and desire to secure by Letters Patent, is—

A self-feeding polishing device, composed of the handle B, the cup A provided with the holes $a\ a$ for delivering downward, and the cork C, the whole being combined and arranged substantially as described.

EBENR. H. ROCKWOOD.
CHARLES D. SHEPARD.

Witnesses:
J. L. NEWTON,
FRANK G. PARKER.